United States Patent
Page et al.

(10) Patent No.: US 12,511,297 B2
(45) Date of Patent: Dec. 30, 2025

(54) TECHNIQUES FOR DETECTING SIMILAR INCIDENTS

(71) Applicant: BigPanda, Inc., Redwood City, CA (US)

(72) Inventors: Alexander Page, Orlando, FL (US); Omri Telem, Ness Ziona (IL); Frank A. Gallagher, Jr., Boulder City, NV (US); Tomer Ben Levi, Tel Aviv (IL)

(73) Assignee: BigPanda, Inc., Redwood City, CA (US)

( * ) Notice: Subject to any disclaimer, the term of this patent is extended or adjusted under 35 U.S.C. 154(b) by 0 days.

(21) Appl. No.: 18/434,044

(22) Filed: Feb. 6, 2024

(65) Prior Publication Data
US 2025/0252108 A1     Aug. 7, 2025

(51) Int. Cl.
*G06F 16/2457* (2019.01)
*G06F 16/22* (2019.01)
*G06F 16/28* (2019.01)

(52) U.S. Cl.
CPC .... *G06F 16/24578* (2019.01); *G06F 16/2237* (2019.01); *G06F 16/285* (2019.01)

(58) Field of Classification Search
CPC ........... G06F 16/24578; G06F 16/2237; G06F 16/285
See application file for complete search history.

(56) References Cited

U.S. PATENT DOCUMENTS

| 10,067,760 | B2 * | 9/2018 | Ryali | G06F 16/3347 |
| 10,911,470 | B2 | 2/2021 | Muddu et al. | |
| 11,853,415 | B1 * | 12/2023 | Wainer | G06F 21/552 |
| 12,014,428 | B1 * | 6/2024 | Turner | G06F 16/909 |
| 2019/0097909 | A1 * | 3/2019 | Puri | G06F 16/951 |
| 2024/0134774 | A1 * | 4/2024 | Sydow | G06F 8/71 |

FOREIGN PATENT DOCUMENTS

| AU | 2014214545 A1 * | 7/2015 | ....... G08B 13/19671 |
| CN | 110008311 A * | 7/2019 | |

* cited by examiner

*Primary Examiner* — Tuankhanh D Phan
(74) *Attorney, Agent, or Firm* — M&B IP Analysts, LLC (57) ABSTRACT

A system and method for detecting similar incident records for initiating remediation actions in a computing environment is provided. The method includes: receiving a plurality of incident records, each incident record generated based on extracted values from a plurality of event records; generating an indexed incident record based on a plurality of predetermined categorical attributes; vectorizing a string of categorical attributes to generate a vectorized indexed incident record; storing the vectorized indexed incident record in a vector database; vectorizing a new incident record; querying the vector database based on the vectorized new incident record to detect a similar vector; and generating a similar incident record based on the detected similar vector.

23 Claims, 6 Drawing Sheets

TECHNIQUES FOR DETECTING SIMILAR INCIDENTS

TECHNICAL FIELD

The present disclosure relates generally to big data, and specifically to detecting incidents, similar incidents, and providing remediation based on similar incident detection.

BACKGROUND

Incident detection in big data system operations is a crucial aspect of maintaining the health, performance, and security of complex data ecosystems. It involves the identification and analysis of abnormal patterns, events, or deviations from the expected behavior within the system. This process helps organizations to proactively address issues before they escalate, ensuring smooth and efficient data operations.

In big data environments, incident detection often relies on advanced monitoring and analytics tools that can handle large volumes of data generated by diverse sources. These tools utilize machine learning algorithms and statistical models to identify anomalies, outliers, or potential security threats in real-time. By continuously monitoring data streams, incident detection systems can swiftly pinpoint issues such as system failures, performance bottlenecks, or security breaches.

Identifying an incident, however, is not enough, incidents indicate a problem that needs to be addressed at an operational level. Big data systems are inherently complex, with numerous components and interdependencies. Detecting and responding to incidents in such intricate environments can be challenging, as issues may arise from various sources and affect different parts of the system simultaneously. Managing the sheer scale of data and system components requires sophisticated incident response strategies.

The sheer volume and velocity of data in big data environments make it challenging to respond to incidents in a timely manner. Delays in detecting and addressing issues can lead to increased downtime, compromised data integrity, or security breaches. Implementing efficient incident response processes to swiftly analyze, prioritize, and mitigate incidents is crucial.

To address these challenges, organizations often employ a combination of automated incident detection tools, skilled personnel, and well-defined response procedures. Regular testing and refinement of incident response plans are essential to adapt to evolving threats and ensure the effectiveness of the overall system operations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving a plurality of incident records, each incident record generated based on extracted values from a plurality of event records. Method may also include generating an indexed incident record based on a plurality of predetermined categorical attributes. Method may furthermore include vectorizing a string of categorical attributes to generate a vectorized indexed incident record. Method may in addition include storing the vectorized indexed incident record in a vector database. Method may moreover include vectorizing a new incident record. Method may also include querying the vector database based on the vectorized new incident record to detect a similar vector. Method may furthermore include generating a similar incident record based on the detected similar vector. Other embodiments of this aspect include corresponding computer systems, apparatus, and computer programs recorded on one or more computer storage devices, each configured to perform the actions of the methods.

Implementations may include one or more of the following features. Method where vectorizing an indexed incident record further comprises: generating a prompt for a large language model (LLM), based on a plurality of indices of an incident record; and executing the prompt utilizing the LLM. Method may include: generating a second prompt for the LLM, based on the similar incident record and the new incident record, where the prompt, when executed, configures the LLM to output a textual explanation of similarity. Method may include: receiving an input based on the similar incident record; and training the LLM based on the received input. Method may include: generating a similarity score between the similar incident record and the new incident record based on a vector distance of the vectorized indexed incident record and the vectorized new incident record. Method may include: populating a categorical attribute of a first index of the incident record based on a first matching data field. Method may include: populating a list of categorical attributes of a second index of the incident record based on each matching data field. Method may include: querying the vector database to detect a plurality of similar incident records, each similar incident corresponding to a vectorized indexed incident record having a vector distance less than a predetermined threshold value. Method may include: generating a visualization of the plurality of similar incident records, where the similar incident records are displayed in an order corresponding to a similarity score associated with each similar incident record. Method may include: determining the vector distance based on a first group of vectors of a similar incident record, and a second group of vectors of the new incident record, each vector generated based on an index of categorical attributes. Implementations of the described techniques may include hardware, a method or process, or a computer tangible medium.

In one general aspect, non-transitory computer-readable medium may include one or more instructions that, when executed by one or more processors of a device, cause the device to: receive a plurality of incident records, each incident record generated based on extracted values from a plurality of event records; generate an indexed incident record based on a plurality of predetermined categorical attributes; vectorize a string of categorical attributes to generate a vectorized indexed incident record; store the vectorized indexed incident record in a vector database; vectorize a new incident record; query the vector database based on the vectorized new incident record to detect a similar vector; and generate a similar incident record based on the detected similar vector. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive a plurality of incident records, each incident record generated based on extracted values from a plurality of event records. System may in addition generate an indexed incident record based on a plurality of predetermined categorical attributes. System may moreover vectorize a string of categorical attributes to generate a vectorized indexed incident record. System may also store the vectorized indexed incident record in a vector database. System may furthermore vectorize a new incident record. System may in addition query the vector database based on the vectorized new incident record to detect a similar vector. System may moreover generate a similar incident record based on the detected similar vector. Other embodiments of this aspect include corresponding computer systems, apparatus, and computer programs recorded on one or more computer storage devices, each configured to perform the actions of the methods.

Implementations may include one or more of the following features. System where the memory contains further instructions that, when executed by the processing circuitry for vectorizing an indexed incident record, further configure the system to: generate a prompt for a large language model (LLM), based on a plurality of indices of an incident record; and execute the prompt utilizing the LLM. System where the memory contains further instructions which when executed by the processing circuitry further configure the system to: generate a second prompt for the LLM, based on the similar incident record and the new incident record, where the prompt, when executed, configures the LLM to output a textual explanation of similarity. System where the memory contains further instructions which when executed by the processing circuitry further configure the system to: receive an input based on the similar incident record; and train the LLM based on the received input. System where the memory contains further instructions which when executed by the processing circuitry further configure the system to: generate a similarity score between the similar incident record and the new incident record based on a vector distance of the vectorized indexed incident record and the vectorized new incident record. System where the memory contains further instructions which when executed by the processing circuitry further configure the system to: populate a categorical attribute of a first index of the incident record based on a first matching data field. System where the memory contains further instructions which when executed by the processing circuitry further configure the system to: populate a list of categorical attributes of a second index of the incident record based on each matching data field. System where the memory contains further instructions which when executed by the processing circuitry further configure the system to: query the vector database to detect a plurality of similar incident records, each similar incident corresponding to a vectorized indexed incident record having a vector distance less than a predetermined threshold value. System where the memory contains further instructions which when executed by the processing circuitry further configure the system to: generate a visualization of the plurality of similar incident records, where the similar incident records are displayed in an order corresponding to a similarity score associated with each similar incident record. System where the memory contains further instructions which when executed by the processing circuitry further configure the system to: determine the vector distance based on a first group of vectors of a similar incident record, and a second group of vectors of the new incident record, each vector generated based on an index of categorical attributes. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
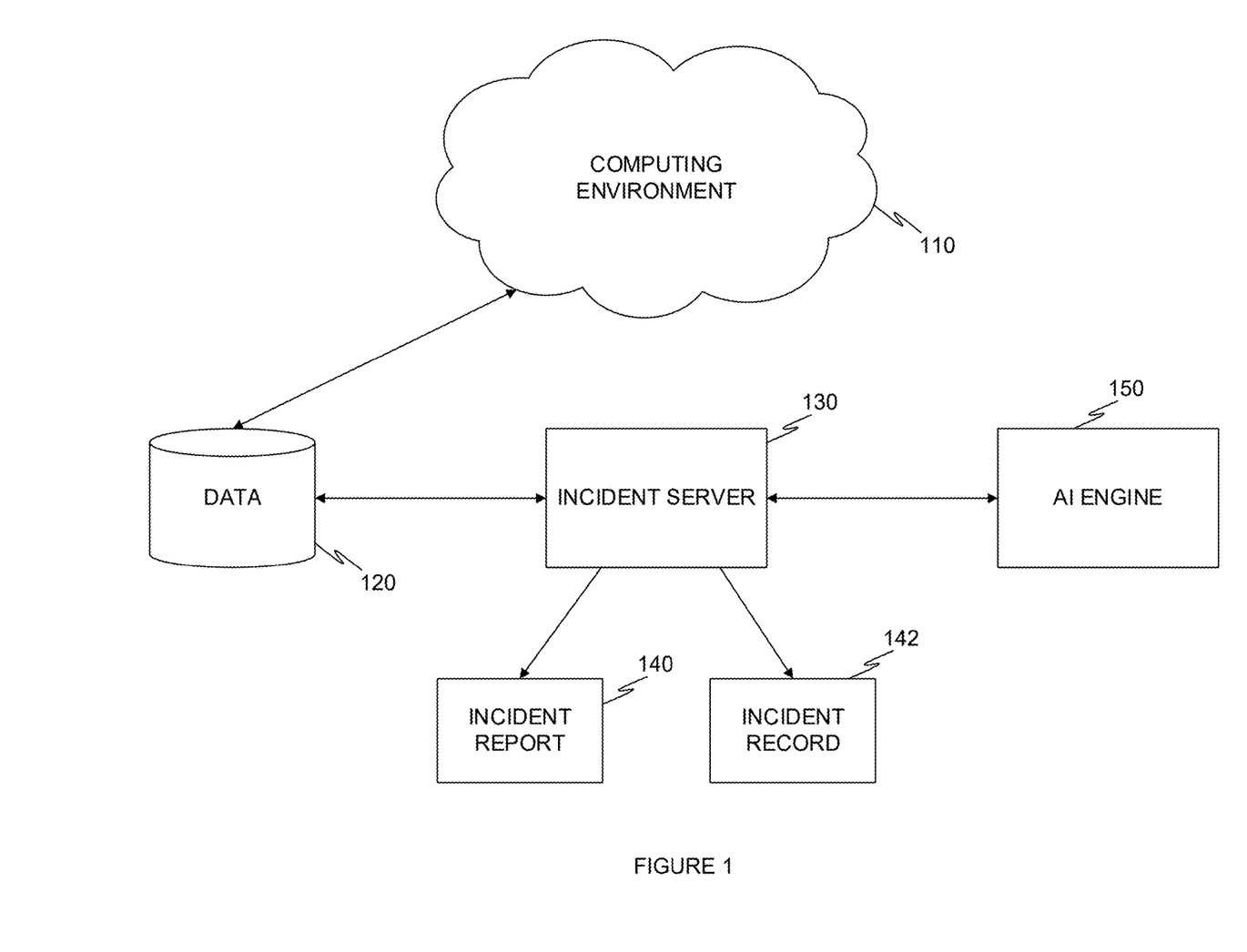
FIG. 1 is an example schematic illustration of a network diagram including an incident server, implemented in accordance with an embodiment.

FIG. 1 is an example schematic illustration of a network diagram including an incident server, implemented in accordance with an embodiment. In an embodiment, a computing environment 110 includes a plurality of entities. In some embodiments, the computing environment 110 is a cloud computing environment, an on-prem computing environment, a networked computing environment, a hybrid computing environment, a combination thereof, and the like.

For example, according to an embodiment, a computing environment 110 includes a virtual private cloud (VPC), a virtual network (VNet), a virtual private network (VPN), a subnet, a combination thereof, and the like. In certain embodiments, a cloud computing environment is implemented on a cloud computing infrastructure, such as Amazon® Web Services (AWS), Google® Cloud Platform, Microsoft® Azure, and the like.

According to an embodiment, an entity is, for example, a resource, a principal, various combinations thereof, and the like. In an embodiment, a resource is a virtual instance, such as a virtual machine, a software container, a serverless function, a combination thereof, and the like. In certain embodiments, a resource exposes a hardware resource, a virtual resource, and the like, of the computing environment, for use by a principal.

In some embodiments, a principal is an entity which is authorized to initiate actions in the computing environment 110. For example, according to an embodiment, a principal is a user account, a service account, a user group, a user role, a local account, an administrator account, various combinations thereof, and the like.

According to an embodiment, the computing environment 110 is configured to generate records of actions, events, alerts, and the like, initiated, performed, etc., in the computing environment 110. For example, in an embodiment, a first resource (e.g., a load balancer) is configured to communicate with a second resource (e.g., a web server). In some embodiments, each resource is configured to write a record for every action performed, such as sending a communication from the first resource to the second resource, receiving a communication by the second resource from the first resource, initiating a user account, updating privilege of a user account, writing to a bucket, accessing a log, etc.

In certain embodiments, an event record indicates a change in the computing environment 110. For example, in an embodiment, a change includes blocking network traffic on a specific port, provisioning a web application firewall (WAF), provisioning a proxy server, changing permission of a resource, changing permission of a principal, updating a software application version, updating an operating system version, changing a software library, changing a software binary, a combination thereof, and the like.

In an embodiment, the computing environment 110, a resource, a principal, a combination thereof, and the like, are configured to write events, records, etc. to a data store 120. In certain embodiments, the data store 120 is implemented as a bucket which is configured to store thereon events received from, for example, a serverless function deployed in the computing environment 110. In an embodiment, the data store 120 is a managed service (e.g., SaaS), such as AWS CloudTrail®.

In some embodiments, the data store 120 includes a network log, a cloud log, an identity and access management (IAM) log, a combination thereof, and the like. In some embodiments, a log includes a plurality of data records. For example, a data record includes data values which pertain to a specific event, action, and the like, performed in the computing environment, to the computing environment, etc. In some embodiments, a data record includes a plurality of data fields, each data field storing a value.

According to an embodiment, a data record is parsed to extract a data field value therefrom. In an embodiment, the data record is parsed to extracted values only from predetermined data fields. In certain embodiments, a predetermined field identifier is determined prior to extracting data values from a data record. For example, in an embodiment, a data field identifier is defined by a tag, e.g., 'machine_id'. In such an example embodiment, data records are parsed to identify the predetermined tag (e.g., the 'machine_id') tag, and a value in the data record which corresponds to the tag is extracted therefrom.

In certain embodiments, an incident server 130 is configured to access a data store 120 and extract data values from data records stored thereon, or otherwise accessible thereto. In an embodiment, an incident server 130 is configured to generate an incident record 142. In some embodiments, the incident record 142 includes data values extracted from a plurality of data records.

In some embodiments, the incident server 130 is configured to generate an incident record 142 based on a predetermined heuristic, rule, policy, combination thereof, and the like. For example, in an embodiment, the incident server 130 is configured to correlate a plurality of events into an incident record 142. In some embodiments, a plurality of incidents are correlated based on a tag (e.g., a data field), a plurality of tags, a time window, a time frame, a combination thereof, and the like.

In an embodiment, the incident server 130 is further configured to generate an incident report 140. In certain embodiments, the incident report 140 is generated based on the incident record 142, the plurality of events which are correlated to the incident record 142, a combination thereof, and the like.

According to some embodiments, the incident server 130 is configured to generate an input for an artificial intelligence (AI) engine 150. In an embodiment, the AI engine includes a large language model (LLM). In some embodiments, the LLM is OpenAI® GPT, Google® PaLM, Meta® LLaMA, and the like.

In certain embodiments, the incident server 130 is configured to generate the input for the AI engine 150 as a prompt. In some embodiments, incident server is configured to generate the prompt based on a predefined template.

For example, in an embodiment, the incident server 130 is configured to generate a prompt based on a plurality of correlated events and provide the generated prompt to an LLM of an AI engine 150. In some embodiments, the prompt, when processed by the LLM, configures the AI engine 150 to generate an output. In an embodiment, the generated output is utilized in generating an incident report 140.

In some embodiments, an incident report 140 includes an incident summary, a root cause analysis, a root cause analysis reasoning, a combination thereof, and the like. In an embodiment, the incident report 140 is stored as a data file, data record, and the like. In some embodiments, the incident report 140 is further generated based on a template, a plurality of correlated events, an output of an LLM, a combination thereof, and the like.

Figure 2:
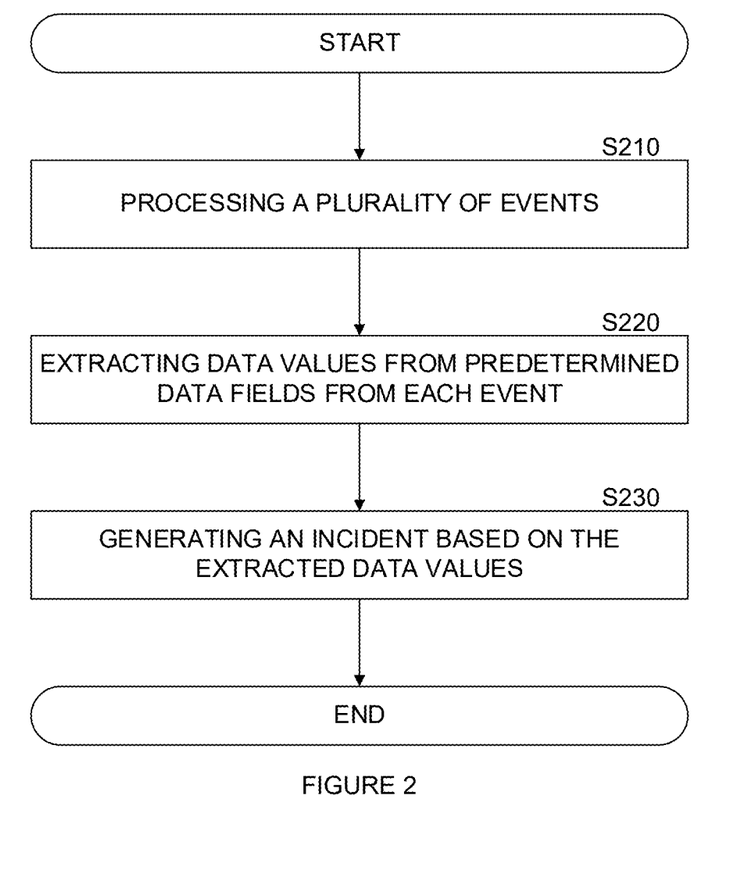
FIG. 2 is an example flowchart of a method for generating an incident data record based on a plurality of event records, implemented in accordance with an embodiment.

FIG. 2 is an example flowchart of a method for generating an incident data record based on a plurality of event records, implemented in accordance with an embodiment. In some embodiments, generating an incident data record (also referred to as 'incident' or 'incident record') is performed by an incident server, such as described in more detail herein. In some embodiments, the incident server is configured to generate an incident record by utilizing an AI engine, for example having an LLM.

In an embodiment, the AI engine, the incident server, and the like, are configured to provide context data to the LLM. In some embodiments, context data includes a data schema, metadata, and the like. In an embodiment, the incident server is configured to generate a prompt using retrieval augmented generation (RAG). In certain embodiments, generating a prompt using RAG includes generating a prompt based on context data. In an embodiment, context data is retrieved from a data store.

At S210, a plurality of event records are processed. In an embodiment, a plurality of event records (also referred to as 'events') are received. In certain embodiments, the events are received as a stream of events. In some embodiments, an event log, a cloud log, a network log, a bucket, a cloud-based storage, combinations thereof, and the like, are accessed to retrieve therefrom event records.

In an embodiment, accessing a store of event records includes receiving an access credentials, such as a token, a username, a password, a combination thereof, and the like, where the credentials provide temporary access, permanent access, etc. In an embodiment, event records are received (or otherwise accessed) continuously, periodically, dynamically, adaptively, and the like.

In an embodiment, dynamic access includes accessing event records at a pace which changes over time. In some embodiments, adaptive access includes changing access times based on, for example, a number of records. As an example, in an embodiment, at a first rate of access, 100 event records are fetched. The rate of access is decreased, until a second rate of access, at which a number of events fetched exceeds a threshold.

In an embodiment, an event record is an alert, a record of communication between resources (e.g., machines, virtual instances, and the like in a computing environment), a record of communication between principals, a record of creating a principal, a failure of a component of the computing environment, various combinations thereof, and the like.

At S220, data values are extracted from an event record. In an embodiment, an event record is parsed based on predetermined data fields. In an embodiment, an event record is parsed based on a predetermined tag. According to some embodiments, a tag includes a plurality of identifiers of data fields, each of which pertains to a same type, context, and the like, of data. For example, a tag 'resource' is associated with data fields 'id', 'name', 'machine', and the like, according to an embodiment.

In certain embodiments, a data field is an indicator, for example extracted from an event record. In some embodiments, the event record is parsed to detect keywords, key phrases, and the like. For example, where an event record includes 'ec2-instance_id-region', the parsed terms of 'ec2' indicate that the computing environment is Amazon® Web Services (AWS), and that 'instance_id' is an identifier of a virtual instance deployed in a region 'region' of AWS.

In some embodiments, events are correlated. In certain embodiments, an incident server is configured to correlate a plurality of events. In an embodiment, correlated events correspond to an incident. For example, according to an embodiment, an incident is a loss of service, which corresponds to a first event indicating a failure of a load balancer, a second event indicating a first server is not responding, a third event indicating a second server is not responding, etc. In an embodiment, events are correlated based on a timestamp, a data field, an indicator, metadata, data values, and the like, of event records.

At S230, an incident record is generated. In an embodiment, an incident server is configured to generate an incident record based on data extracted from a plurality of events. In some embodiments, it is advantageous to maintain an incident record, as the incident record contains therein only data that is predetermined to be relevant to an incident. Thus, the amount of data is reduced, which allows to store multiple incidents for a longer time (e.g., using the same amount of storage), allows searching through incident records faster (i.e., searching a smaller data set is faster than searching through a larger data set), etc.

In some embodiments, the incident record is further generated based on a result from an AI engine. In certain embodiments, a plurality of incidents are provided to an AI engine in order to determine which events are correlated to a single incident. In some embodiments, an event is related to a plurality of incidents.

Figure 3:
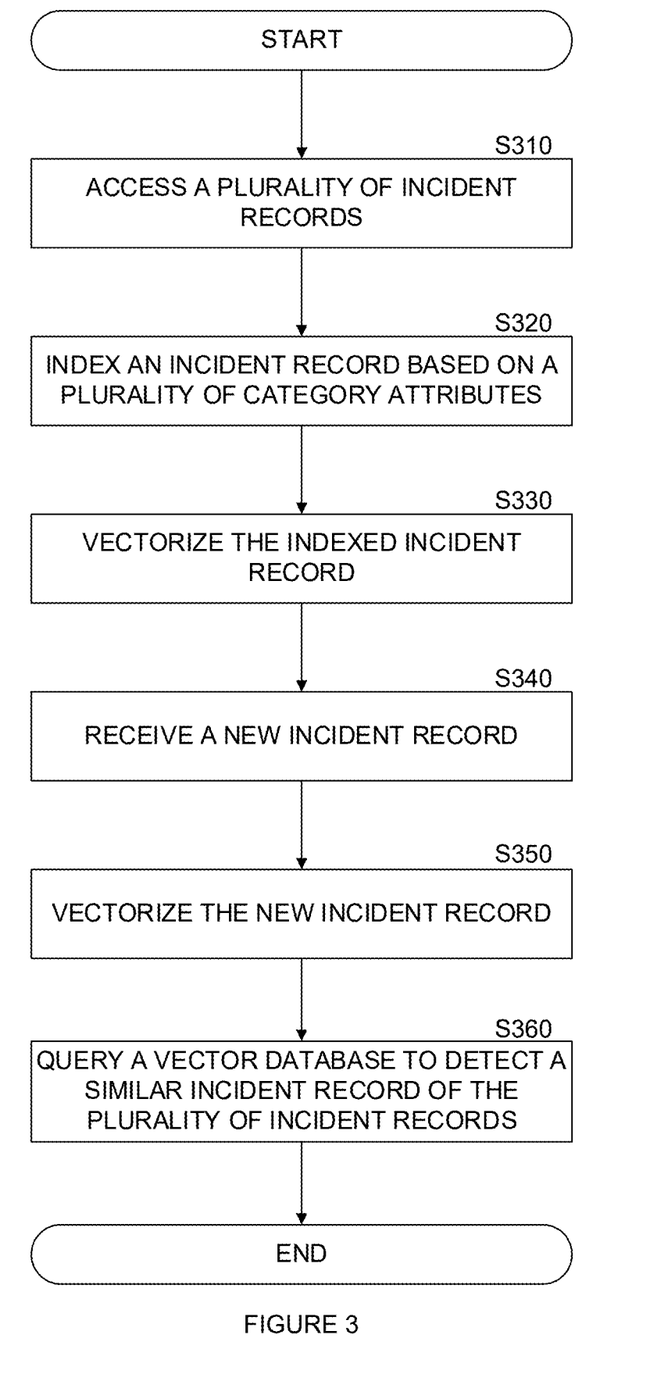
FIG. 3 is an example flowchart of a method for detecting a similar incident record from a plurality of preexisting incident records, implemented in accordance with an embodiment.

FIG. 3 is an example flowchart of a method for detecting a similar incident record from a plurality of preexisting incident records, implemented in accordance with an embodiment.

At S310, a plurality of incident records are received. In an embodiment, the plurality of incident records are generated, for example utilizing the teachings discussed in more detail herein.

In an embodiment, an incident server is configured to generate an incident record based on data extracted from a plurality of events. In some embodiments, it is advantageous to maintain an incident record, as the incident record contains therein only data that is predetermined to be relevant to an incident.

At S320, an incident record is indexed. In an embodiment, an incident record is indexed based on a plurality of index categories. For example, in an embodiment, a first index category includes a plurality of data fields, attributes, and the like. In some embodiments, an incident record is parsed to detect a data field which matches one of the plurality of attributes of an index category. For example, in an embodiment, a first index includes a plurality of attributes, which are arranged in a particular order in a data record.

For example, in an embodiment, an index attribute includes a container name, a host name, a node identifier, a database identifier, etc. In some embodiments, an incident record is scanned, parsed, etc., to detect a value which matches the first attribute (e.g., container name) of the index attributes. In an embodiment, if no value is detected in the incident record, the incident record is scanned to detect a value which matches the second attribute (e.g., host identifier) of the index data fields.

In some embodiments, an index is populated based on the first matching attribute. In certain embodiments, a first matching attribute is a first attribute of the index record which has a value corresponding in the incident record.

In an embodiment, a second index category includes a plurality of data fields (e.g. attributes), each of which is populated based on data fields of the incident record. For example, in some embodiments, index categories of a first type (e.g., the first index) are populated based on a first matching data field, and index categories of a second type (e.g., the second index) are populated based on each matching data field.

At S330, the an index category is vectorized. In an embodiment, the indexed incident record is vectorized, for example by vectorizing the index records. In some embodiments, an AI engine is configured to vectorize an incident record, an indexed incident record, and the like. In an embodiment, vectorization is performed for each category. In some embodiments, the index attributes are stored as a string, an vectorizing the index category includes vectorizing a string of categorical attributes to generate the vectorized indexed incident record.

In certain embodiments, the AI engine is configured to generate a prompt for a large language (LLM) which is utilized to vectorize the indexed incident record (e.g., vectorize each index category). In an embodiment, the prompt, when executed by the LLM, generates an output which includes a vectorized indexed incident record. In some embodiments, the LLM is fine-tuned, for example based on a data schema of the incident record, of an alert generator, of a ticketing system, a combination thereof, and the like. In certain embodiments, the LLM is provided with retrieval augmented generation (RAG) data. For example, RAG data includes metadata of an incident record, a data schema of a database, a combination thereof, and the like.

In an embodiment, the vectorized indexed incident record is stored in a vector database. In some embodiments, the index categories utilized to generate the vectorized incident record include an entity index, an issue index, an impact index, a topology index, a combination thereof, and the like.

For example, in an embodiment, an entity index includes an identifier of a host, a node, an object, a container name, an application, an impacted entity, a database, a network device, a server, an endpoint, a monitored URL, an IP address, a combination thereof, and the like.

In some embodiments, an issue index includes a check, a problem, a title, a health rule, an alert name, a search name, a monitor name, an issue, a rule name, an alert metric, an event name, a description, a combination thereof, and the like.

According to an embodiment, an impact index includes an identifier of an application, a service, a platform, a business entity, a component, an impacted service, an endpoint, a partner, a customer, a combination thereof, and the like.

In certain embodiments, a topology index includes a dependency, a connection, a host name, a cluster, a location, a rack, a data center, a region, a zone, an environment, a combination thereof, and the like.

In some embodiments, the incident record (e.g., the index categories of the incident record) is further vectorized based on a number of alerts, a date, an incident duration, a combination thereof, and the like.

In certain embodiments, each index category further includes a weight value. In some embodiments, vectorizing a plurality of index categories is further performed based on the included weight.

At S340, a new incident record is received. In an embodiment, the new incident record is an incident record which is not previously vectorized, indexed, etc. In some embodiments, new incident records are received, generated, and the like, periodically, continuously, a combination thereof, and the like.

At S350, the new incident record is vectorized. In an embodiment, the new incident record is vectorized by populating index categories from the new incident record to generate an indexed new incident record, and vectorizing the indexed new incident record. For example, in an embodiment, vectorizing the new incident record is performed utilizing S330 above. In some embodiments, indexing the new incident record is performed utilizing S320 above.

At S360, a vector database is queried. In an embodiment, the vector database stores therein a plurality of previously vectorized indexed incident records. In some embodiments, querying the vector database includes configuring the vector database to output an identifier of a vectorized incident data record of the plurality of incident data records which matches the vectorized new incident record.

For example, according to an embodiment, the vector database is configured to detect a vector stored in the vector database, such that the distance between the detected vector and the vector of the new incident record is at a threshold, below a threshold, a combination thereof, and the like.

In certain embodiment, a vector is generated for each index category of the incident record. In some embodiments, a similar incident record is detected by selecting a vector from the vector database having an overall shortest distance from the vector(s) of the new incident record.

In an embodiment, each index category is further associated with a weight value. According to some embodiments, a similarity score is generated for each index category between two vectors, and an overall similarity score is generated further based on the weight value of each category.

In some embodiments, an incident record includes a remediation action, a mitigation action, a combination thereof, and the like. It is therefore beneficial to detect a similar incident, as the similar incident provides information which indicates, for example, what remediation actions were executed, which action was effective, which action was not effective, etc.

In an embodiment, a remediation action, a mitigation action, a combination thereof, and the like, are initiated based on the similar incident detection. For example, in an embodiment, a graphical user interface is configured to render a graphical element indicating a plurality of remediation actions. In some embodiments, each remediation action is further assigned a score, indicating effectiveness of the remediation action on the current incident represented by the incident record.

Figure 4:
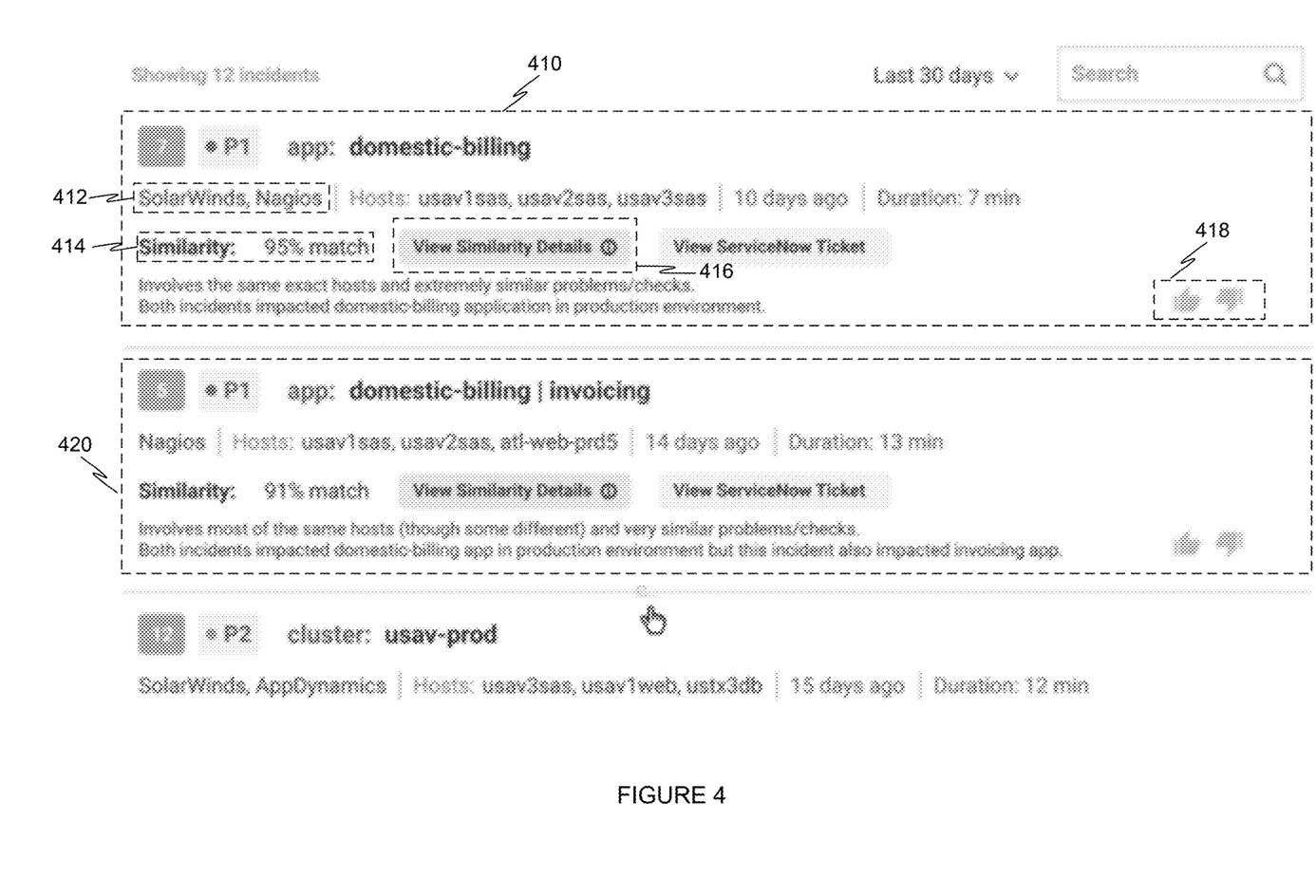
FIG. 4 is an example illustration of a graphical user interface for displaying a plurality of similar incidents, implemented in accordance with an embodiment.

FIG. 4 is an example illustration of a graphical user interface for displaying a plurality of similar incidents, implemented in accordance with an embodiment. In an embodiment, a plurality of similar incidents are detected based on a new incident, for example utilizing the methods described in more detail herein.

According to an embodiment, a first similar incident 410 is rendered above a rendering of a second similar incident 420, as the first similar incident 410 is more similar than the second similar incident 420 to a new incident. In an embodiment, a similar incident having a shorter vector distance between a vector representing the similar incident and a vector representing the new incident.

In an embodiment, the first similar incident 410 includes a source 412, which indicates what alerts, events, and the like, were utilized to generate the incident record corresponding to the first similar incident 410.

In some embodiments, the first similar incident 410 further includes a similarity score 414. According to an embodiment, the similarity score is generated based on the distance between a vectorized representation of the similar incident and a vectorized representation of the new incident. In an embodiment, a higher similarity score indicates a shorter distance between the two vectors.

In this example illustration, the similarity score of the first similar incident 410 is 95%, which is higher than the similarity score of the second similar incident 420 which is 91%.

In an embodiment, the first similar incident 410 includes a detail graphical element 416. In some embodiment, the detail graphical element 416, when interacted with (for example by registering a click) configures a system to generate a second graphical user interface, which provides more detail about the first similar incident 410.

Figure 5:
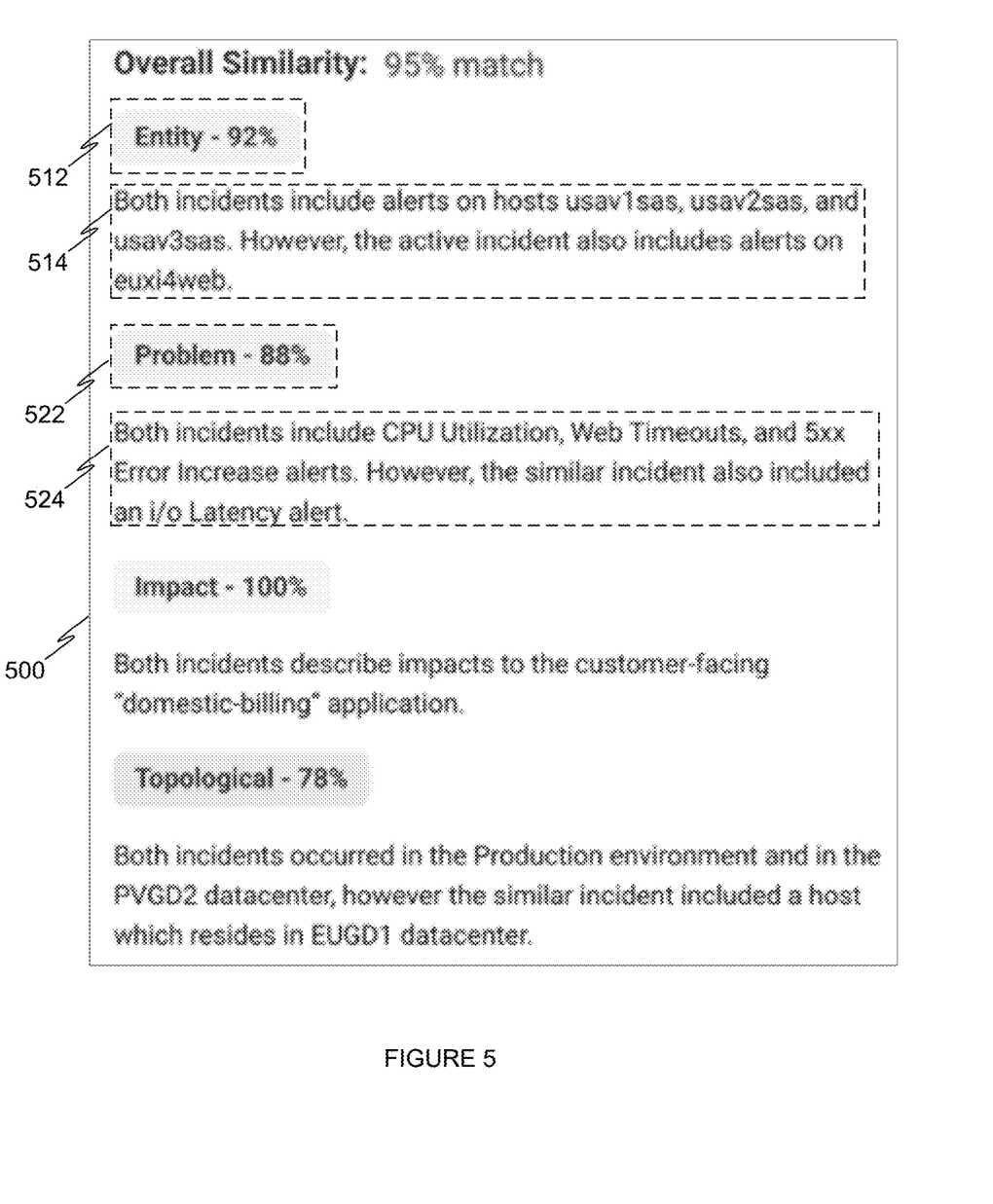
FIG. 5 is an example illustration of a graphical user interface of a similar incident detail, implemented in accordance with an embodiment.

FIG. 5 is an example illustration of a graphical user interface of a similar incident detail, implemented in accordance with an embodiment. In an embodiment, the graphical user interface includes graphical elements, textual elements, a combination thereof, and the like.

In some embodiments, a similar incident detail includes a plurality of index records, a corresponding matching score, an explanation text, a combination thereof, and the like. For example, in an embodiment, a first index 512 indicates an 'entity' index. In an embodiment, the entity index 512 includes a match score. In certain embodiments, the match score is generated based on a vector distance between a vectorized index of an entity index of a first incident, and a vectorized index of an entity index of a second (e.g., similar) incident.

According to an embodiment, an AI engine is configured to generate an explanation output, which is presented as a text, such as textual element 514. In certain embodiments, the AI engine is configured to generate the explanation based on a generated prompt.

For example, in certain embodiments, the prompt is provided to an LLM for execution. In an embodiment, the prompt is generated based on a prompt template. In some embodiments, the prompt template is modified based on: a vectorized index of a first incident record, a corresponding vectorized index of a second incident record, a data field of a first incident record, a data field of a second incident record, a combination thereof, and the like.

In an embodiment, GUI element includes a feedback input, such as feedback element 418 of FIG. 4 above. In some embodiments, the AI engine is further provided with an input of the feedback element 418, which indicates if the similar incident is similar or not. In an embodiment, the feedback input 418 is utilized to provide an input based on the overall similarity score, an individual index similarity score (e.g., the scores of first index 512, second index 522, etc.), a text explanation (e.g., text of the first textual element 514, text of the second textual element 524, etc.), a combination thereof, and the like.

In certain embodiments, the input provided through the feedback input 418 is utilized in providing training, such as supervised training to the AI engine, to an AI model of the AI engine, and the like, for example such as a large language model of the AI engine.

Figure 6:
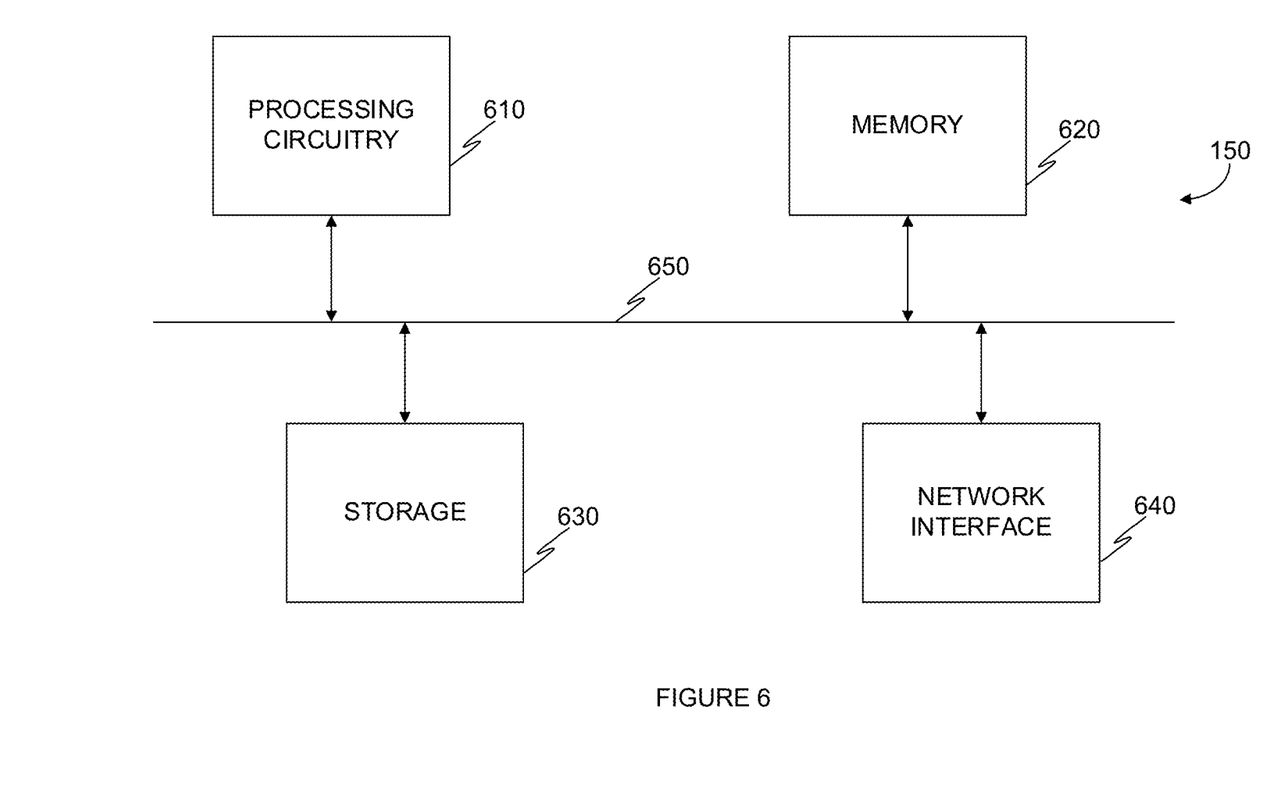
FIG. 6 is an example schematic diagram of an AI engine according to an embodiment.

FIG. 6 is an example schematic diagram of an AI engine 150 according to an embodiment. The AI engine 150 includes, according to an embodiment, a processing circuitry 610 coupled to a memory 620, a storage 630, and a network interface 640. In an embodiment, the components of the AI engine 150 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 620 is a volatile memory (e.g., random access memory, etc.), a non-volatile memory (e.g., read only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 640 is configured to provide the AI engine 150 with communication with, for example, the incident server 130, the data store 120, a combination thereof, and the like, according to an embodiment.

It should be understood that the embodiments described herein are not limited to the specific architecture illustrated in FIG. 6, and other architectures may be equally used without departing from the scope of the disclosed embodiments.

Furthermore, in certain embodiments the incident server 130, the AI engine 150, a combination thereof, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for detecting similar incident records for initiating remediation actions in a computing environment, comprising:
   receiving a plurality of incident records, each incident record generated based on extracted values from a plurality of event records;
   generating, for each of the incident records, an indexed incident record based on a plurality of predetermined categorical attributes;
   vectorizing a string of categorical attributes to generate a vectorized indexed incident record for each of the incident records;
   storing the vectorized indexed incident record for each of the incident records in a vector database;
   vectorizing a new incident record that is not one of the plurality of incident records;
   querying the vector database based on the vectorized new incident record to detect a similar vector; and
   generating a similar incident record based on the detected similar vector.

2. The method of claim 1, wherein vectorizing an indexed incident record further comprises:
   generating a prompt for a large language model (LLM), based on a plurality of indices of an incident record; and
   executing the prompt utilizing the LLM.

3. The method of claim 2, further comprising:
   generating a second prompt for the LLM, based on the similar incident record and the new incident record, wherein the prompt, when executed, configures the LLM to output a textual explanation of similarity.

4. The method of claim 1, further comprising:
   generating a similarity score between the similar incident record and the new incident record based on a vector distance of the vectorized indexed incident record and the vectorized new incident record.

5. The method of claim 2, further comprising:
   receiving an input based on the similar incident record; and
   training the LLM based on the received input.

6. The method of claim 1, further comprising:
   populating a categorical attribute of a first index of the incident record based on a first matching data field.

7. The method of claim 6, further comprising:
   populating a list of categorical attributes of a second index of the incident record based on each matching data field.

8. The method of claim 1, further comprising:
   querying the vector database to detect a plurality of similar incident records, each similar incident corresponding to a vectorized indexed incident record having a vector distance less than a predetermined threshold value.

9. The method of claim 8, further comprising:
   generating a visualization of the plurality of similar incident records, wherein the similar incident records are displayed in an order corresponding to a similarity score associated with each similar incident record.

10. The method of claim 1, further comprising:
    determining a vector distance based on a first group of vectors of a similar incident record, and a second group of vectors of the new incident record, each vector generated based on an index of categorical attributes.

11. A non-transitory computer-readable medium storing a set of instructions for detecting similar incident records for initiating remediation actions in a computing environment, the set of instructions comprising:
    one or more instructions that, when executed by one or more processors of a device, cause the device to:
    receive a plurality of incident records, each incident record generated based on extracted values from a plurality of event records;
    generate, for each of the incident records, an indexed incident record based on a plurality of predetermined categorical attributes;
    vectorize a string of categorical attributes to generate a vectorized indexed incident record for each of the incident records;
    store the vectorized indexed incident record for each of the incident records in a vector database;
    vectorize a new incident record that is not one of the plurality of incident records;
    query the vector database based on the vectorized new incident record to detect a similar vector; and
    generate a similar incident record based on the detected similar vector.

12. A system for detecting similar incident records for initiating remediation actions in a computing environment comprising:
    a processing circuitry;
    a memory, the memory containing instructions that, when executed by the processing circuitry, configure the system to:
    receive a plurality of incident records, each incident record generated based on extracted values from a plurality of event records;
    generate, for each of the incident records, an indexed incident record based on a plurality of predetermined categorical attributes;
    vectorize a string of categorical attributes to generate a vectorized indexed incident record for each of the incident records;
    store the vectorized indexed incident record for each of the incident records in a vector database;
    vectorize a new incident record that is not one of the plurality of incident records;

query the vector database based on the vectorized new incident record to detect a similar vector; and generate a similar incident record based on the detected similar vector.

13. The system of claim 12, wherein the memory contains further instructions that, when executed by the processing circuitry for vectorizing an indexed incident record, further configure the system to:

generate a prompt for a large language model (LLM), based on a plurality of indices of an incident record; and execute the prompt utilizing the LLM.

14. The system of claim 13, wherein the memory contains further instructions which when executed by the processing circuitry further configure the system to:

generate a second prompt for the LLM, based on the similar incident record and the new incident record, wherein the prompt, when executed, configures the LLM to output a textual explanation of similarity.

15. The system of claim 13, wherein the memory contains further instructions which when executed by the processing circuitry further configure the system to:

receive an input based on the similar incident record; and
train the LLM based on the received input.

16. The system of claim 12, wherein the memory contains further instructions which when executed by the processing circuitry further configure the system to:

generate a similarity score between the similar incident record and the new incident record based on a vector distance of the vectorized indexed incident record and the vectorized new incident record.

17. The system of claim 12, wherein the memory contains further instructions which when executed by the processing circuitry further configure the system to:

populate a categorical attribute of a first index of the incident record based on a first matching data field.

18. The system of claim 17, wherein the memory contains further instructions which when executed by the processing circuitry further configure the system to:

populate a list of categorical attributes of a second index of the incident record based on each matching data field.

19. The system of claim 12, wherein the memory contains further instructions which when executed by the processing circuitry further configure the system to:

query the vector database to detect a plurality of similar incident records, each similar incident corresponding to a vectorized indexed incident record having a vector distance less than a predetermined threshold value.

20. The system of claim 19, wherein the memory contains further instructions which when executed by the processing circuitry further configure the system to:

generate a visualization of the plurality of similar incident records, wherein the similar incident records are displayed in an order corresponding to a similarity score associated with each similar incident record.

21. The system of claim 12, wherein the memory contains further instructions which when executed by the processing circuitry further configure the system to:

determine a vector distance based on a first group of vectors of a similar incident record, and a second group of vectors of the new incident record, each vector generated based on an index of categorical attributes.

22. The method of claim 1, further comprising:

performing a remediation action that was performed for the detected similar vector.

23. The method of claim 1, wherein the computing environment is a cloud computing environment implemented on a cloud computing infrastructure.

* * * * *